UNITED STATES PATENT OFFICE.

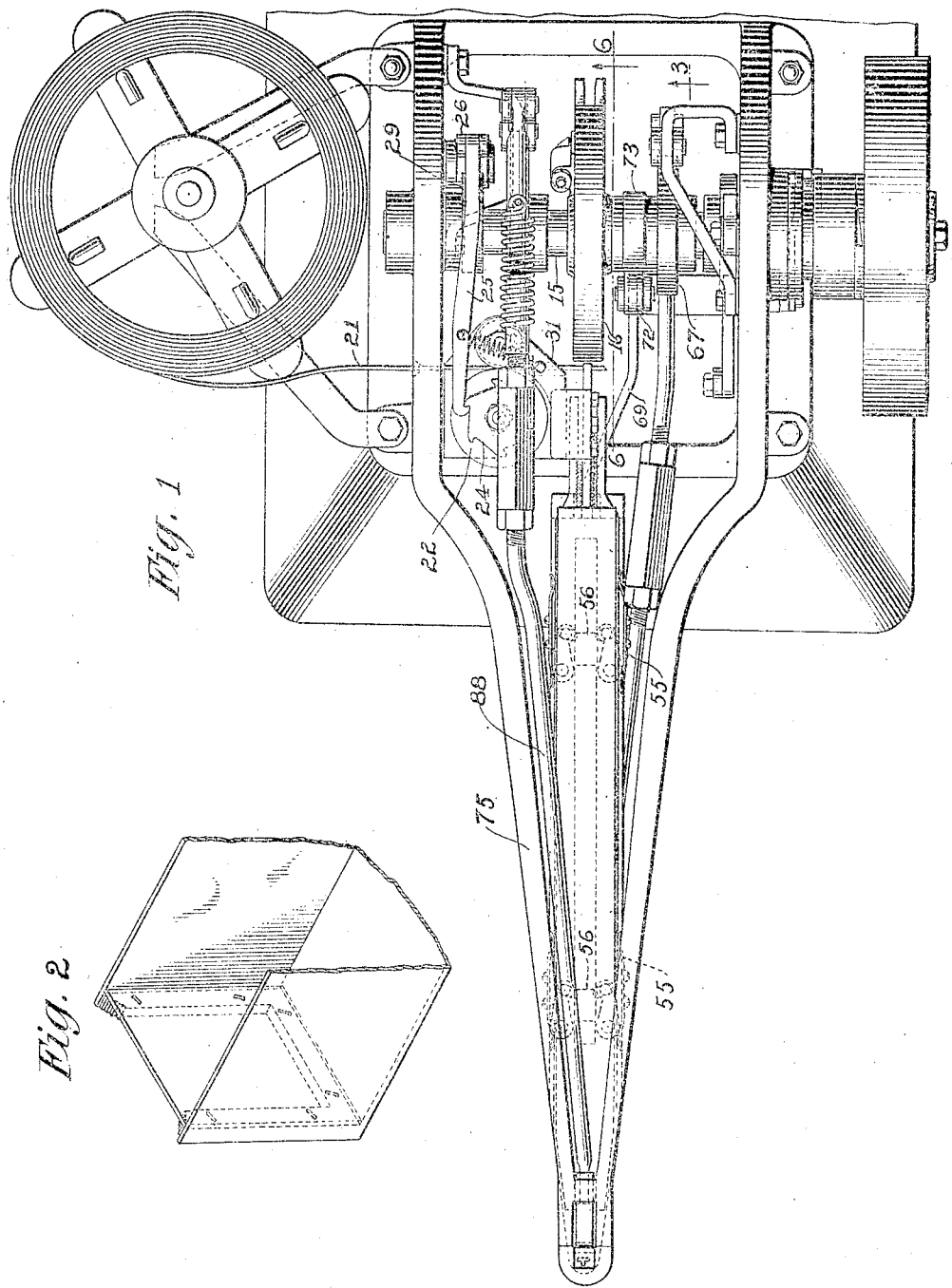

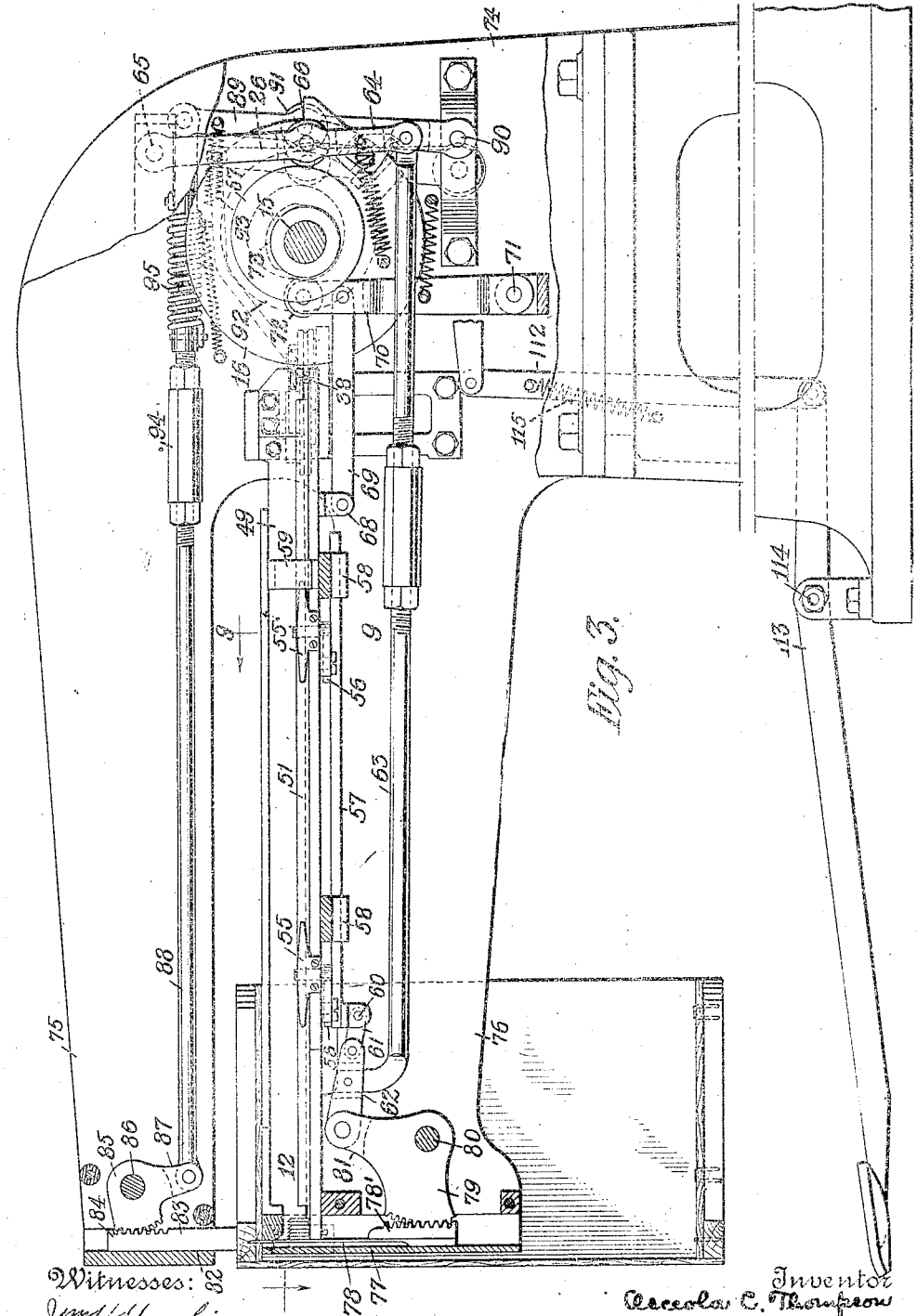

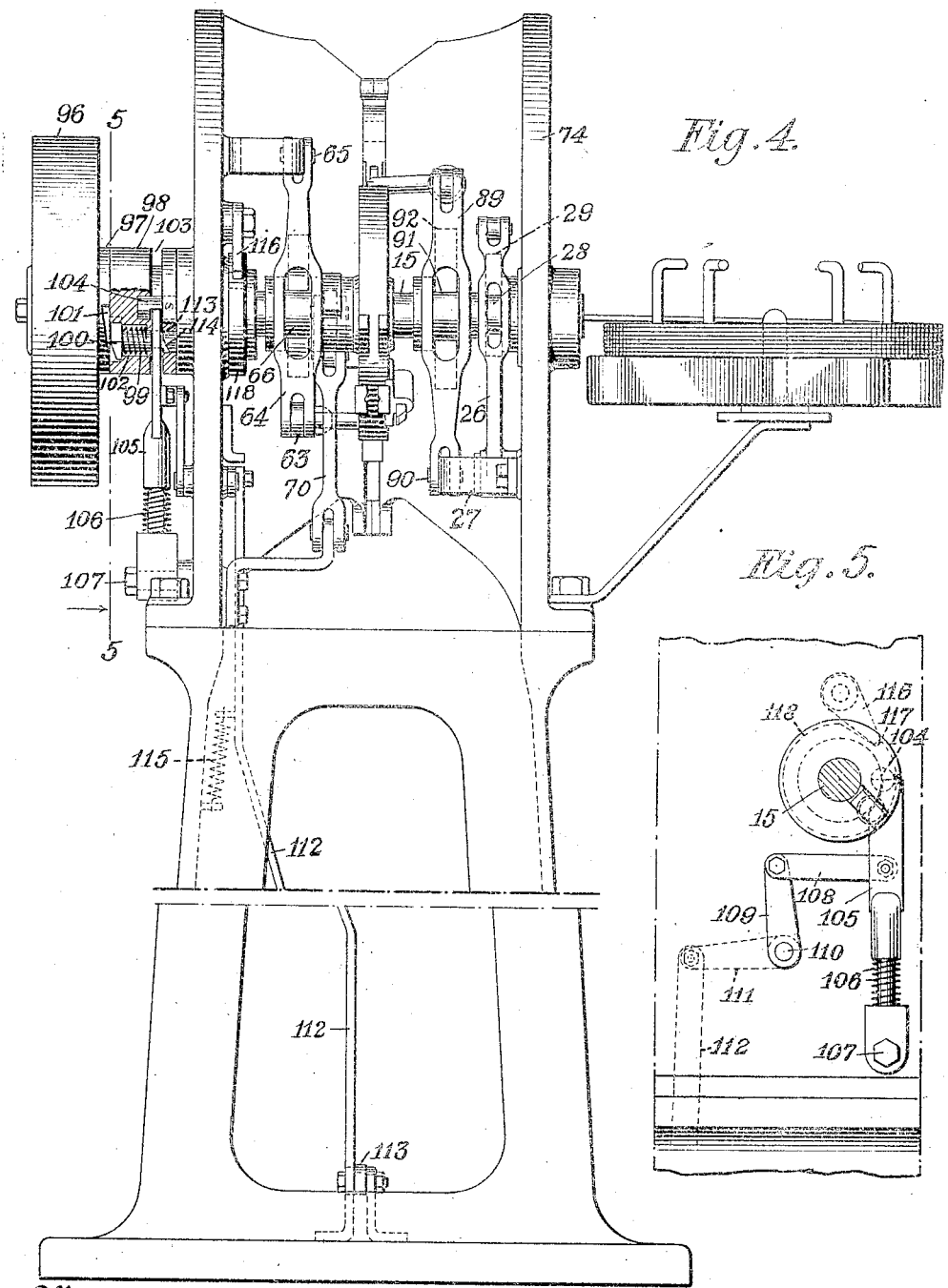

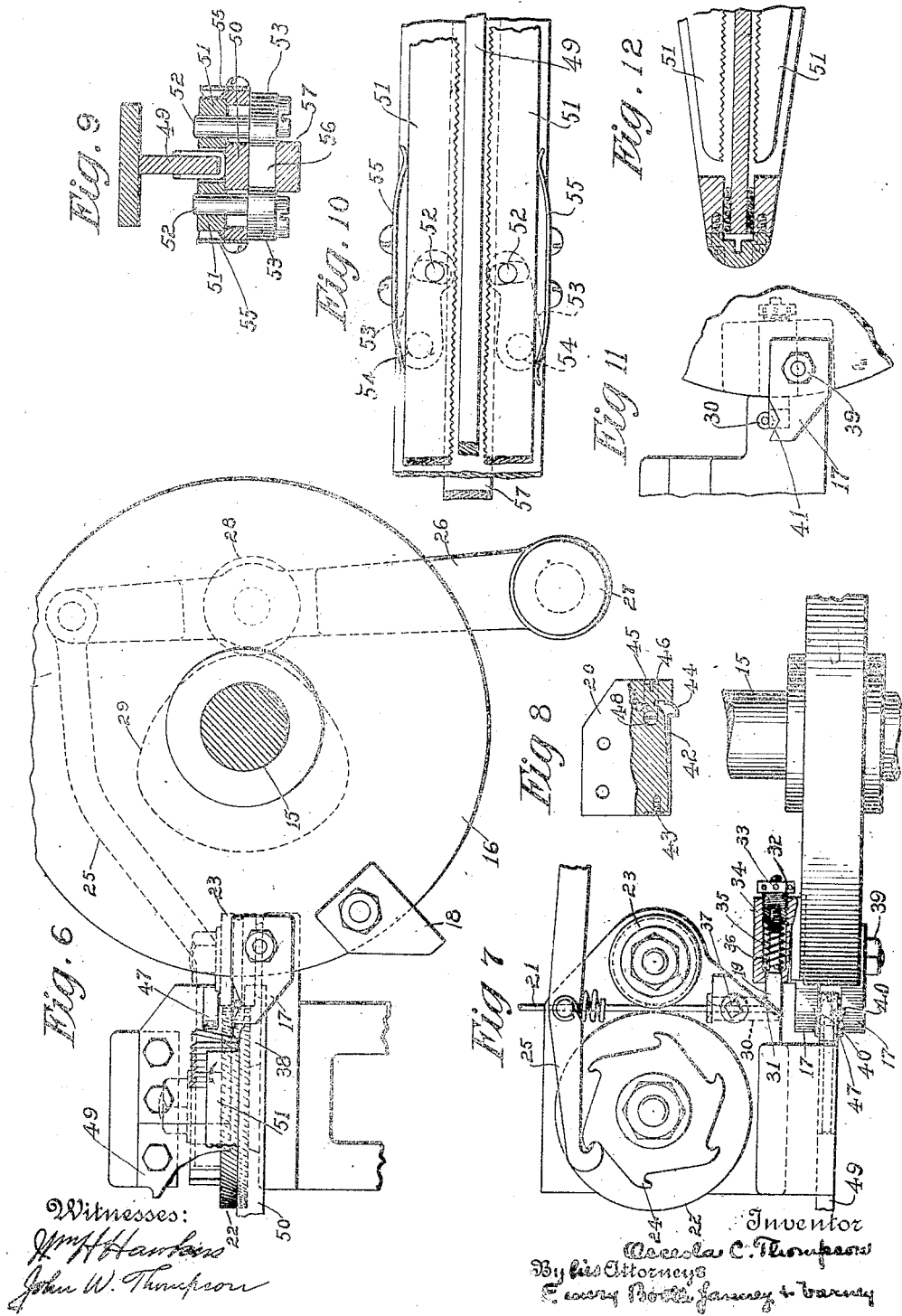

OSCEOLA C. THOMPSON, OF NEW YORK, N. Y., ASSIGNOR TO WIREBOUNDS PATENTS COMPANY, A CORPORATION OF MAINE.

BOX-END-STAPLING MACHINE.

1,295,237.

Specification of Letters Patent. Patented Feb. 25, 1919.

Application filed February 12, 1912. Serial No. 677,190.

*To all whom it may concern:*

Be it known that I, OSCEOLA C. THOMPSON, a citizen of the United States, and a resident of New York, in the county and State of New York, have invented an Improvement in Box-End-Stapling Machines, of which the following description, in connection with the accompanying drawings, is a specification, like characters on the drawings representing like parts.

This invention relates to box end stapling machines and is intended to provide various improvements contributing to expedite and simplify the forming, feeding and driving of staples.

The character of the invention may be readily understood by reference to an illustrative embodiment shown in the accompanying drawings in which—

Figure 1 is a plan view of the illustrative embodiment of my invention;

Fig. 2 is a perspective view of the end portion of a box illustrating the staples driven thereinto and securing the box end against the inner faces of the end cleats of the wirebound box blank;

Fig. 3 is a sectional view partly in elevation on the line 3—3 of Fig. 1;

Fig. 4 is an elevation of the machine partly broken away as viewed from the right-hand side of Fig. 3;

Fig. 5 is a detail section on the line 5—5 of Fig. 4;

Fig. 6 is a detail section at an enlarged scale on the line 6—6 of Fig. 1;

Fig. 7 is a detail plan view at an enlarged scale of the wire feeding devices, wire cutting devices and staple forming devices;

Fig. 8 is a detail elevation partly in vertical section of the former plate and its detent springs;

Fig. 9 is a detail section at an enlarged scale on the line 9—9 of Fig. 3;

Fig. 10 is a detail plan at an enlarged scale of a portion of the four-motion feeding mechanism.

Fig. 11 is a detail elevation at an enlarged scale of the wire cutting devices and wipers illustrating particularly the coöperative action of the cutting devices; and, Fig. 12 is a detail plan section at an enlarged scale on the line 12—12 of Fig. 3.

Referring to Figs. 1 and 3, the illustrative mechanism comprises a cam shaft 15 driven in any suitable manner as for example by a clutch mechanism hereinafter described, said shaft carrying the various actuating cams for the machine, the same being timed as hereinafter explained.

Fixed upon the shaft 15 is a forming disk 16 carrying on the periphery thereof coöperating wipers 17—17 (see particularly Figs. 6 and 7), staple feeding cams 18—18 (see Fig. 6) and a wire cutter 19 (see Fig. 7). As shown in Fig. 7 the wipers 17—17 are spaced apart sufficiently to receive between them, as the disk 16 is rotated, a former plate 20. As shown in Figs. 1 and 4, the wire or other staple material 21 may be provided on a reel from which it is fed between a knurled feed wheel 22 and an idle presser wheel 23, the latter being preferably grooved peripherally suitably to engage the wire. The feed wheel 22 is positively driven by a ratchet and pawl mechanism well shown in Figs. 1 and 7, in which the ratchet 24 is engaged by a spring pressed pawl 25 connected to a cam lever 26 pivoted at 27. The lever 26 carries a roll 28 to engage a wire feeding cam 29 on the cam shaft 15.

From the feeding rolls the wire 21 enters a guide tube 30, from which the wire issues at a shearing blade 31 (see Figs. 1 and 7). The shearing blade 31 coöperates with a mating blade on the cutter 19, the latter being adjustably carried as shown in Fig. 7 on the disk 16. For the purposes of adjustment, the cutter 19 is provided with a screw threaded shank 32 having screw threaded engagement with the internal bore of a differential adjusting nut 33. The adjusting nut 33 in turn is externally screw threaded to engage a suitable support herein a bracket 34 secured to the face of the disk 16. The cutter 19 is non-rotatably mounted in the bracket 34 with the consequence that when the nut 33 is rotated the cutter is longitudinally adjusted. The bracket 34 is provided with a recess 35 which receives a helical spring 36 encircling the shank of the cutter and bearing at one end against the inner end of the nut 33, thus providing a yielding resistance which prevents accidental turning movement of the nut. By the adjusting means just described, the cutter 19 may be adjusted with respect to the shearing blade 31 as it becomes necessary from time to time to grind the coöperating faces of the cutters. The tube 30 may also be longitudinally adjusted and provided with a set screw 37 whereby the tube also may be adjusted as it becomes necessary to grind its shearing blade.

The feed of the wire by the described pawl and ratchet mechanism is such that each feeding step projects the wire a distance beyond the shearing blade 31 sufficient to provide wire for a single staple when the same is severed. Preferably the blade on the cutter 19 and the shearing blade 31 sever the wire obliquely to its axis to provide a point to facilitate the driving of the staple.

As the wire 21 is fed beyond the shearing blade 31, it passes beneath the former plate 20, as shown in Figs. 3 and 6 and when severed, presents equal lengths of wire at opposite sides of the former plate 20, said equal lengths being subsequently turned upwardly to form the legs of the staple.

When a length of staple wire is thus positioned beneath the former plate 20, it is severed by the cutter 19 and is held in place after the staple forming operation by means of a retainer 38 (see Figs. 3 and 6). Subsequently and promptly following the severing operation, the rotation of the disk 16 presents the wipers 17—17 beneath the severed length of wire and then wipes the opposite ends of the wire upwardly to form a staple upon the former plate with the staple legs on opposite sides of the plate, as shown in Fig. 7.

Preferably, the formers 17—17 are separately mounted upon the disk 16 herein by means of a screw or bolt 39 so that they may be removed and ground upon their inner faces to correct them for the wear which naturally takes place due to their wiping action upon the legs of the staple.

The staple formed, as just described, stands temporarily in such a position that it would obstruct the next following feed of the wire to present a new staple length; but in the further rotation of the disk 16, the staple feeding cams 18 engage the newly formed staple and wipe it out of the path of the wire feed in an obvious manner. Thereafter, the wire feeding and staple forming operations ensue as above described.

Preferably the wipers 17—17 are provided on their opposed or inner faces with grooves 40—40 to receive the legs of the staple. Preferably, also, the wipers are provided with notches or depressions 41—41, which assist in guiding and positioning the wire.

In a staple forming and feeding mechanism, it is highly desirable and in fact substantially indispensable that some means be provided for controlling the staples as they are formed in order that they shall be presented in proper condition to the feeding devices and to that end I employ detent springs or other suitable means to engage newly formed staples and hold them in desired position until they are presented to and engaged by feeding devices. Referring to Figs. 7 and 8, the former plate 20 is provided on its underside with a detent spring 42 suitably secured thereto as by means of a screw 43. This spring is provided with a depending projection 44 rounded at its rear side to permit the heel or base portion of the staples to easily pass toward the left (see Fig. 8) but having at its forward side an abrupt shoulder to prevent retrograde movement of the staples. The former plate is also provided with a detent spring 45 secured thereto in any suitable manner as for example, by means of a screw 46 and having two resilient arms 47—47 inclined toward the left (see Fig. 7) and terminating in abrupt shoulders as clearly shown in said figure, the free ends of said arms being turned inwardly toward each other through an aperture 48 provided in the former plate 20. This detent spring serves to engage the legs or points of the staples and while it permits the staples to pass freely toward the left (see Figs. 6 and 7), it prevents the staples from toppling over toward the disk 16 and its attached parts as would be the natural tendency of the staples were it not for the provision of this means, as will be evident from an inspection of Fig. 6. In this way, when the staples have been formed and pushed along the former plate 20 by the cams 18—18, the staples are prevented from interfering with the wire feed.

When the feeding cams 18—18 leave a newly formed staple, the latter stands with its legs projecting vertically upward and the staple is then controlled by the detent means just described. When the next succeeding staple is formed and fed forward by the cams 18—18, the preceding staples are pushed the width of one staple toward the left in Fig. 6; and in a succession of these operations, the staples are ultimately presented to feeding devices which, in the illustrative mechanism, positively engage them and feed them in a series to any desired point as, for instance, to a driving point.

The illustrative feeding mechanism comprises a guide plate 49 abutting against the end of the former plate 20 and constituting in effect a continuation of the latter. As the staples are fed from the former plate 20 to the guide plate 49, they straddle the latter with their legs projecting upwardly as shown in Fig. 9 and rest upon a supporting plate 50 which is in effect an extension of the support 38, the plate 50 preferably extending throughout the feeding travel of the staples. The guide plate 50 in the specific mechanism, performs merely a guiding and holding function while the feeding operation is performed by oppositely disposed jaws 51—51 which are serrated vertically to engage by their serrations a series of staples. The operation of the specific jaws 51—51 is that of the so-called "four-motion feed" that is to say, at the end of a feeding movement toward the left in Fig. 10, the jaws are moved apart; they are then moved toward the right in Fig. 10, are then moved toward each other to renewed engagement with the staples and are then moved toward the left in Fig. 10 to feed the staples through a desired feed step.

The view of this "four-motion feed" mechanism in Fig. 10 is largely fragmentary, it being unnecessary to show or describe the same in great detail since the specific mechanism is not novel in my invention save in combination with other features recited in the claims. It will suffice to say, therefore, that each jaw 51 rests in sliding contact upon the upper face of the plate 50 as shown in Fig. 9, and each jaw is transfixed by a pin 52 mounted in rocking arm 53 pivoted at 54 to the plate 50. The pins 52 pass through elongated slots provided in the plate 50 which permit that movement of the pins 52 by which the jaws 51—51 are moved toward and away from each other during the 'four-motion feed.'

In practice, it is preferred that the pins 52, arms 53 and pivots 54, as just described and as illustrated in Figs. 9 and 10 be duplicated near the left hand end of the "four-motion feeding" devices, as shown in Figs. 1 and 3 in order that each jaw may be controlled at two points. The jaws 51—51 are pressed toward each other by means of pairs of springs 55—55, two bearing against each jaw, said springs being mounted upon the stationary plate 50. The effect of the springs 55—55 is to press both the jaws toward the guide plate 49 so that each leg of each staple will be yieldingly engaged between a jaw and a side of the guide plate 49. The jaws 51—51 are separated by forcing wedge-shaped cams 56—56 between the ends of each pair of arms 53—53 which carry the pins 52—52. These cams 56 are carried upon a slide bar 57 mounted in appropriate guide ways 58—58 secured to brackets 59—59 depending from and secured to the guide bar 49, said slide bar having pivoted to it at 60 a link 61 connecting the latter with a second link 62, the forward end of which is supported as hereinafter described. To the central portion of the link 62, there is pivoted a long link 63 connecting with a cam lever 64 fulcrumed at 65 and having a roller 66 to engage a cam 67 secured to the cam shaft 15. The operation of the cam 67 is such that at appropriate intervals the wedge-shaped cams 56 are moved toward the right in Fig. 3 to force the pins 52 apart to release the staples from feeding engagement with the jaws 51—51 so that thereafter said jaws may be moved toward the right in Figs. 3 and 10 into position for renewed engagement with the staples.

Heretofore in this description, it has been convenient to refer to the plate 50 as being "stationary" and during the lateral movements of the jaws 51—51, said plate is in fact stationary; but the endwise movement of the jaws 51—51 is effected by moving the plate 50 endwise and for this purpose said plate has a depending lug 68 which is connected by a link 69 with a cam lever 70 fulcrumed at 71 and having a cam roll 72 engaging a cam 73. The operation of the cam 73 is to move endwise at rope intervals the plate 50 and those parts carried thereby including the jaws 51—51, pins 52—52, arms 53—53, pivots 54—54 and springs 55—55.

The timing of the "four-motion feeding" cams 67 and 73 will be readily understood by those skilled in the art without further description.

The operation of that portion of the illustrative machine which has already been described in detail is as follows:

The wire feeding pawl and ratchet mechanism feeds in a length of wire; the rotating disk 16 first presents the cutter 19 to sever the wire against the shearing blade 31; the wipers 17—17 wipe the severed wire up on opposite sides of the former plate 20; the feeding cams 18—18 on the disk 16 move the staple toward the left in Figs. 1, 3 and 6; and ultimately as successive staples are so formed and fed by the feeding cams 18—18, the staples are presented in position to be engaged by the jaws 51—51 as the latter are moved toward each other at the limit of their movement toward the right in Figs. 1, 3 and 10, the cams 56—56 having been rotated toward the left in Figs. 1, 3 and 10 in order to permit the springs 55—55 to press the jaws 51—51 into feeding engagement with the staples just at or after the jaws have completed their endwise travel toward the right in Figs. 1, 3 and 10. The staples being thus engaged by the jaws 51—51, the latter are moved toward the left preferably to a distance through the thickness of the staple wire in order to feed the staples toward the left in Figs. 1, 3 and 10. At the end of such a feed step, the cams 56—56 are moved toward the right again to force the jaws 51—51 apart and release the staples, whereupon said jaws are returned toward the right in Figs. 1, 3 and 10 for renewed engagement with the staples.

I will now proceed to describe the mechanism by means of which the boxes are held and the staples driven in an upward direction from the inner faces of the box ends.

Referring to Figs. 1 and 3, the frame of the machine comprises a hollow column 74 and an upper forwardly projecting portion bifurcated vertically and horizontally and presenting an upper skeleton arm 75 and a lower skeleton arm 76. Mounted to slide in a vertical guide 77 in the forward end of the arm 76 is a plunger or staple driver 78 provided along its lower portion with a rack 78'. Meshing with this rack is a segmental gear 79 pivoted at 80 and having an arm 81 pivotally connected to the forward end of the link 62. By these connections and the link 63 and cam lever 64, the staple driver 78 is reciprocated at appropriate intervals in the operation of the machine by the cam 67. Mounted in a guide 82 in the forward end of the arm 75 is a vertically reciprocal anvil or clencher bar 83 provided with a rack 84 meshing with a segmental gear 85 pivoted at 86. The segmental gear is provided with an arm 87 to which is pivoted a link 88 connected to a cam lever 89 pivoted at 90 and carrying a cam roll 91 engaging a cam 92 secured to the cam shaft 15, said roll being held against said cam by a spring 93. The link 88 is provided between its ends with a turn buckle 94 by means of which it may be lengthened or shortened, as may be desired. The link is also provided between its ends with suitable yielding means herein a spring 95 (see Figs. 1 and 3) interposed between two distinct portions of the link and serving as a means for providing for a yielding pressure of the anvil or clencher bar 83 upon the box under the action of the cam 92. At each rotation of the shaft 15 the segmental gears 79 and 85 are moved to actuate the staple driver 78 and anvil or clencher bar 83 toward and away from each other at proper intervals in the operation of the machine.

The cam shaft 15 is provided with suitable driving means preferably consisting of a clutch adapted to be clutched to a constantly rotated pulley 96 so as to be rotated one rotation only and stopping always in one position, to wit, the initial position of the driving parts with a staple in position ready to be driven at the next operation.

The preferred clutch employed for this purpose is as follows:

Carried by the constantly rotating pulley 96 is a driving clutch member 97. Secured to the cam shaft 15 is a coöperating driven clutch member 98 adapted to be coupled to the driving member 97 in any suitable manner, as for example, by means of a clutch pin 99 mounted to slide longitudinally in the clutch member 98 and having an inclined end 100 adapted to enter a similarly inclined recess 101 provided in the end of the driving clutch member 97. This pin is normally urged toward the driving clutch member 97 by means of a helical spring 102 encircling said pin. The driven clutch member 98 is provided with a circumferential groove 103 across which is placed a fixed pin 104 which normally abuts against the upper extremity of stopping and starting lever 105 having in its length a spring 106 tending to elongate the same, said lever being fulcrumed at 107 so as to be capable of being swung into and out of the groove 103 and hence into and out of the path of the pin 104. The lever 105 is operated by any suitable means, herein a link connecting said lever to an arm 109 of a bell crank lever 110, the other arm 111 of said bell crank lever being pivotally connected with the upper end of a treadle rod 112. The lower end of the treadle rod is pivoted to a treadle or foot lever 113 fulcrumed at 114 and there is provided a suitable spring 115 normally exerting a downward pull on the treadle rod 112.

The sliding clutch pin 99 is provided with a groove 113 normally registering with the circumferential groove 103 of the driven clutch member 98, as shown in Fig. 4. This groove is provided at its right-hand side (see Fig. 4) with an inclined face 114 adapted to engage the right-hand face of the upper extremity of the lever 105 (see Fig. 4) when the latter enters the circumferential groove 103. When during the rotation of the driven clutch member 98, the inclined face 114 engages the lever 105, the clutch pin 99 is withdrawn from engagement with the recess 101 in the driving clutch member 97. Subsequently and immediately following such withdrawal of the clutch pin, the fixed pin 104 brings up against the upper extremity of the lever 105. When this takes place, the rotation of the driven clutch member 98 is stopped; by this it is meant, that its further free rotation is opposed and such opposition to the rotation is yielding owing to the provision of the cushioning spring 106 which permits the upper portion of the lever 105 to yield downwardly to a certain extent. Naturally, under such circumstances, there is a tendency for the driven clutch member 98 and the parts connected thereto and driven thereby to rebound or, in other words, rotate in the reverse direction under the action of the cushioning spring 106. To prevent such reverse rotation or rebound, there is provided a positive stop herein, a pivoted dog 116 which permits rotation of the driven clutch member 98 under the action of the driven clutch member 97 but automatically acts to stop the reverse rotative movement of the driven member by engaging a tooth or shoulder 117 provided in the periphery of a disk 118 secured to the cam shaft 15. When the operator lifts his foot from the treadle 113, the clutch mechanism just described serves to bring the operative parts of the machine to a state of rest in their initial position ready for the driving of another staple.

In the manufacture of boxes of the type illustrated in Fig. 2, the sides, bottom and top of the box are previously assembled and provided with suitable cleats at their extremities. In the use of the present machine, the box ends are then assembled against the inner faces of the cleats as illustrated in Fig. 2. The box ends are then fastened to the cleats by means of staples driven from the inner face of the box end through the latter and into the cleats. This is done by placing the box parts upon the machine in the position illustrated in Fig. 3 resting upon the support formed by the arm 76 and with the box end extending into the gap between the arms 75 and 76. The operator then moves the assembled box parts along positioning them over the staple driver where the staples are to be driven. To drive a staple, he presses down upon the treadle 113 thus bringing the clutch into action as hereinbefore described. A staple which has been fed from the point where it was formed, as hereinbefore described, arrives with its points or legs up-standing in the guide 77 above the driver 78. The anvil or clencher bar 83 is then automatically pressed downwardly upon the box cleat and the driver drives a staple upwardly through the box end and into the cleat as shown in Fig. 3. While the staple is being thus driven, another staple is being formed by the staple forming parts, as hereinbefore described and is discharged on to the guide bar 49 by which the staple is retained throughout in the inverted position in which it was formed or, in other words, the staple is formed, fed and delivered to the driving mechanism always with its legs or points upstanding. Hence the feeding of the staples is greatly facilitated and can be accomplished much more accurately and with greater certainty than is the case where the staple is formed right-side up or with its legs depending and afterward inverted before being presented to the driven mechanism.

While I have herein shown and described one form of my invention for illustrative purposes, and have disclosed and discussed in detail the construction and arrangement incidental to one specific application thereof, it is to be understood that the invention is limited neither to the mere details or relative arrangement of parts nor to its specific application herein shown but that extensive deviations from the illustrative form or embodiment of the invention may be made without departing from the principles thereof.

Having thus described my invention, what I claim is:

1. In a staple forming and feeding mechanism, the combination of a former plate, wipers coöperating with said former plate to wipe the legs of the staple in an upward direction, means to feed the staples one by one along said former plate with their points upstanding, and detent means to prevent retrograde movement of the staples.

2. In a staple forming and feeding mechanism, the combination of a former plate, wipers coöperating with said former plate to wipe the legs of the staple in an upward direction, means to feed the staples one by one along said former plate with their points upstanding, and means to prevent the staples from toppling over toward said wipers.

3. In a staple forming and feeding mechanism, the combination of a former plate, wipers coöperating with said former plate to wipe the legs of the staple in an upward direction, means to feed the staples one by one along said former plate with their points upstanding, means to support the staples as they are fed along said former plate, and detent means including yielding devices on said plate for permitting the staples to be fed along said plate away from said wipers while preventing substantial retrograde movement of the staples.

4. In a staple forming and feeding mechanism, the combination of a former plate, wipers coöperating with said former plate to wipe the legs of the staple in an upward direction, means to feed the staples one by one along said former plate with their points upstanding, means to support the staples as they are fed along said former plate, yielding detent means to engage the base portion of the staple, and yielding detent means to engage the lateral portions of the staple.

5. In a staple forming and feeding mechanism, the combination of a former plate, wipers coöperating with said former plate to wipe the legs of the staple in an upward direction, means to engage and carry the staples one by one as formed in a continuous row away from the point at which they are formed, means to support the staples by engagement with the bottoms of their bases, and other means to engage a row of said staples and feed the same with their legs upstanding.

6. In a staple forming and feeding mechanism, the combination of means for forming a succession of staples with their legs upstanding, means to engage the last staple formed and feed the row of staples with their legs upstanding away from the point at which they are formed and other means to engage the sides of a row of said staples and feed the same with their legs upstanding.

7. In a machine of the character described, the combination of a guide and former plate, a former disk alined in the plane thereof, and wipers extending radially of said disk to wipe the legs of a staple about said guide and former plate.

In testimony whereof, I have signed my name to this specification, in the presence of two subscribing witnesses.

OSCEOLA C. THOMPSON.

Witnesses:
JOHN W. THOMPSON,
LOUIS A. JONES.